United States Patent [19]

Marquardt et al.

[11] Patent Number: 4,789,254
[45] Date of Patent: Dec. 6, 1988

[54] LARGE ANTIFRICTION BEARING

[75] Inventors: Reinhard Marquardt, Lippstadt; Ernst Priesmeier, Iserlohn, both of Fed. Rep. of Germany

[73] Assignee: Hoesch Aktiengesellschaft, Dortmund, Fed. Rep. of Germany

[21] Appl. No.: 26,763

[22] Filed: Mar. 17, 1987

[30] Foreign Application Priority Data

Mar. 22, 1986 [DE] Fed. Rep. of Germany ....... 3609781

[51] Int. Cl.$^4$ .............................................. F16C 19/30
[52] U.S. Cl. ..................................... 384/611; 384/613; 384/907.1; 384/909
[58] Field of Search ............... 384/619, 611, 613, 616, 384/620, 622, 492, 520, 901.7, 909

[56] References Cited

U.S. PATENT DOCUMENTS

| 2,400,374 | 5/1946 | Selnes | 384/520 |
| 2,609,256 | 9/1952 | Baker et al. | 384/492 |
| 3,814,488 | 6/1974 | Rood | 384/622 |
| 4,573,811 | 3/1986 | Andree et al. | 384/622 |

Primary Examiner—Lenard A. Footland
Attorney, Agent, or Firm—Thomas S. Baker, Jr.

[57] ABSTRACT

Figure 1:
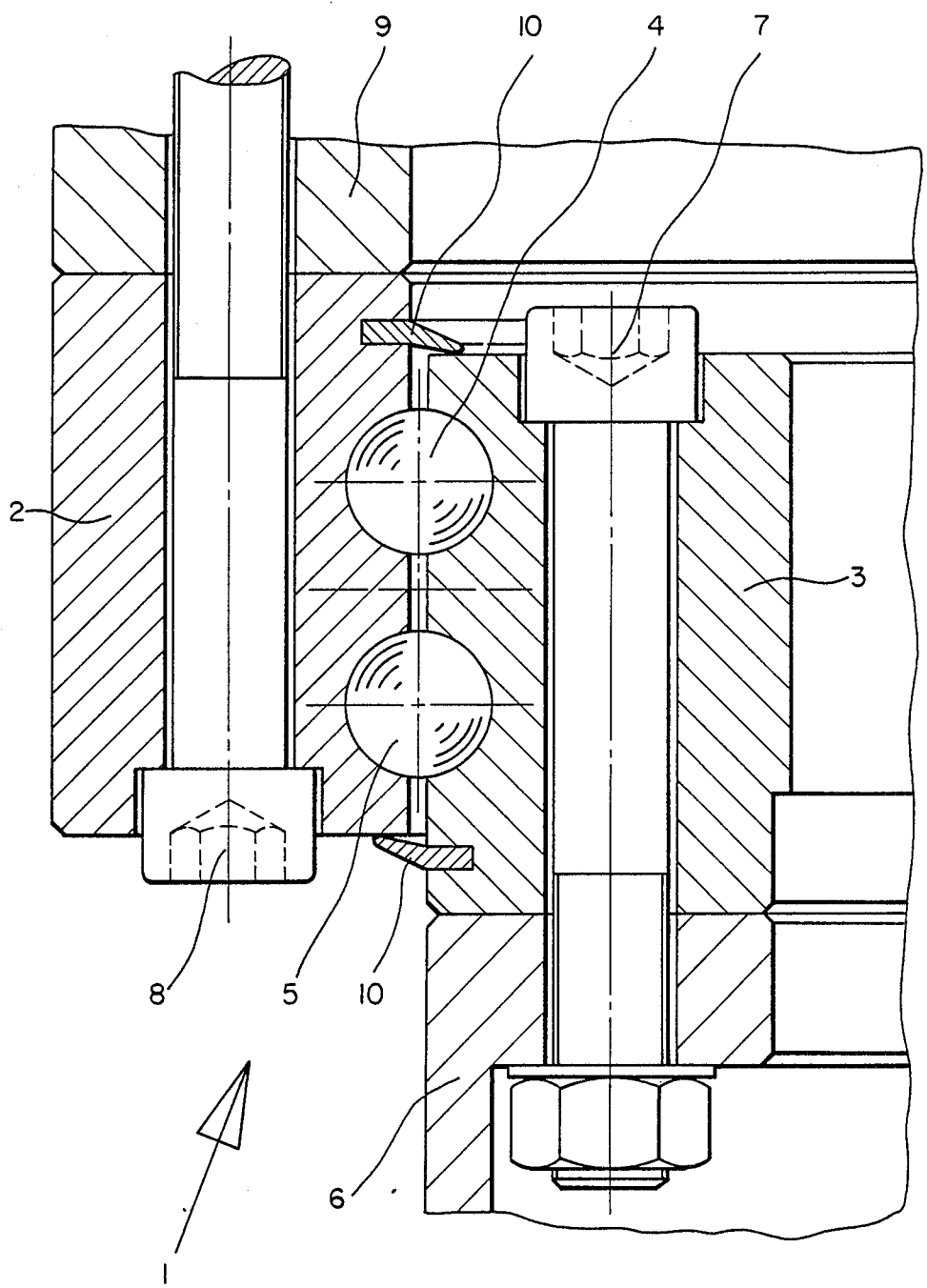

In a large antifriction bearing consisting of two bearing races and at least two track systems disposed therebetween each having a rolling element row which rolls on associated tracks of the bearing races, one rolling element row (4, 11) is of a different material to the other rolling element row (5, 12) to enable bearing properties such as clearance or bias, rotation resistance and wear compensation to be influenced without external action or interventions on the bearing and also to permit compensation of different track tolerances at the periphery (FIG. 1).

4 Claims, 2 Drawing Sheets

LARGE ANTIFRICTION BEARING

The invention relates to a bearing consisting of two bearing races and at least two track systems disposed therebetween and each having a rolling element row rolling on associated tracks of the bearing races.

Large antifriction or roller bearings are used to connect components together rotatably movably, a free passage in the region of the axis of the bearings being ensured. They are used for a great variety of purposes.

Such a large antifriction bearing according to U.S. Pat. No. 3,814,488 serves by doubling the track systems to enable larger forces to be transmitted without however the possibility of influencing the bearing properties.

Although possible in U.S. Pat. No. 2,400,374 by inserting individual resilient rolling elements whose diameter is greater than the accommodation space of the bearing system to obtain a higher rotation resistance, in this design the loadbearing capacity of the bearing is reduced. In addition, in the event of wear of one type of rolling element the function of the other rolling elements is impaired.

Although in German patent application E No. 9735 XII/47 b by installing connecting screws biased via plate springs the bearing rings or races can be adjusted with respect to each other, it is not possible with this step to compensate track irregularities such as eccentricities or undulations.

The invention is therefore based on the problem of providing a large antifriction bearing whose bearing properties such as clearance, bias, rotation resistance or wear compensation can be influenced without external action or modification to the bearing. Also, different track tolerances at the periphery are to be compensated.

This problem is solved according to the invention by the characterizing clause of the main claim. Further advantageous developments of the invention will be apparent from the characterizing clauses of the subsidiary claims.

The advantages achieved with the invention are in particular that with the large antifriction bearing according to the invention a great variety of bearing properties can be influenced in predetermined manner. A further substantial advantage of the bearing according to the invention is apparent under shock loads. The load peaks are taken up by the deformation of the resilient rolling element row itself before the supporting rolling element row takes up the remaining load due to its tolerances.

Figure 2:
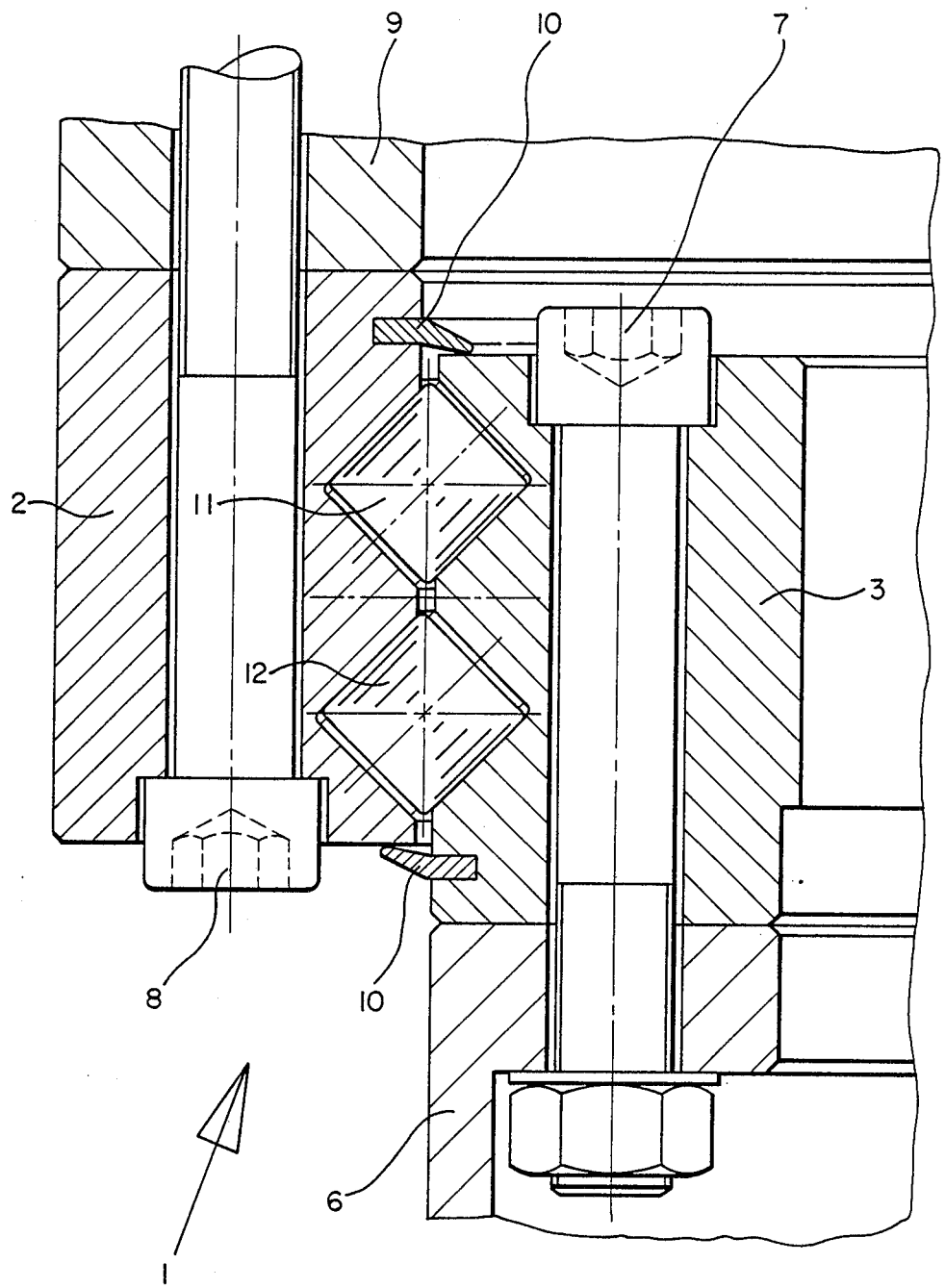

Examples of embodiment of the invention are illustrated schematically in the drawings and will be described in detail hereinafter. The drawings show the bearing according to the invention as follows:

FIG. 1 is a partial section through a constructional form of a two-part two-row radial ball bearing and FIG. 2 is a partial section of a constructional form of a two-part two-row radial cross roller bearing.

The large antifriction bearing 1 consists according to FIG. 1 of an outer ring or race 2 and an inner race 3 which are connected together rotatably via an upper rolling element row 4 of metal balls and a lower rolling element row 5 of plastic balls. The plastic balls 5 have a large diameter than the free space between the tracks so that they are deformed in the installed condition. The inner race 3 is screwed to the fixed substructure 6 via securing screws 9 and the outer race 2 is screwed with the aid of holding screws 8 to the rotatable upperstructure 9. The track region is, as usual, filled with grease or oil and sealed by seals 10 with respect to the outside.

FIG. 2 shows a large antifriction bearing similar to that in FIG. 1 but in this case as upper rolling element row 11 metal rollers are inserted which are arranged alternately turned through 90° with respect to each other. This is thus a two-part two row bearing with a cross roller row.

The lower rolling element row 12 can be equipped with plastic rollers turned alternately through 90° with respect to each other, the diameter of the plastic rollers being greater than the free space between the associated tracks in the track system so that they are again deformed in the installed state. In the same manner the rolling element row 12 may also however be equipped with plastic rollers which all run in the same direction or alternatively in this case as well plastic balls may be used in accordance with FIG. 1, reference numeral 5.

We claim:

1. Large antifriction bearing comprising two bearing races and at least two track systems disposed therebetween and each having a rolling element row rolling on associated tracks of the bearing races, characterized in that the one rolling element row (4, 11) is of a material different to the other rolling element row (5, 12), said other rolling element row (5, 12) is equipped with rolling elements of plastic, and said plastic rolling elements are larger than the accommodation space of the associated track system.

2. Large antifriction friction bearing according to claim 1 characterized in that one rolling element row comprises balls and the other balls or rollers.

3. Large antifriction bearing comprising two bearing races and at least two track systems disposed therebetween and each having a rolling element row rolling on associated tracks of the bearing races, characterized in that the one rolling element row (4, 11) is of a material different to the other rolling element row (5, 12), wherein said one rolling element row is equipped with metal or ceramic rolling elements and the other rolling element row is equipped with rolling elements constructed of a substantially more resiliently yieldable material than said other material, said other rolling element row is equipped with rolling elements of plastic and said plastic rolling elements are larger than the accommodation space of the associated track system.

4. Large antifriction bearing according to claim 3 characterized in that one rolling element comprises balls and the other balls or rollers.

* * * * *